UNITED STATES PATENT OFFICE.

JOHN JAMES KING BOOTE AND WILLIAM ANDERSON GIBSON, OF CLEVELAND, OHIO.

IMPROVEMENT IN ELASTIC CEMENTS FOR LINING PETROLEUM-BARRELS.

Specification forming part of Letters Patent No. 113,485, dated April 11, 1871.

We, JOHN JAMES KING BOOTE and WILLIAM ANDERSON GIBSON, of Cleveland, in the county of Cuyahoga and State of Ohio, have invented a certain Compound.

Said compound is for the purpose of coating or lining the interiors of oil-barrels, and other similar purposes.

The nature of our improvement relates to a compound consisting of glue, sugar, and flour, or other gelatinous, saccharine, and farinaceous equivalents.

We are aware that glue, molasses, or sugar has been known and used; but what distinguishes our improvement consists in making an elastic cement of the ingredients herein specified, combined with water and subjected to a suitable degree of heat.

This cement is prepared as follows: Glue, sixteen parts, is dissolved in hot water; then sixteen parts of sugar or molasses and six parts of flour are intimately combined with the glue by stirring the ingredients in a suitable vessel over a fire.

Sufficient amount of water is employed to reduce the cement to about the consistency of common paint, or so that it will flow freely when used.

This cement, being elastic and tenacious in its character, is not liable to crack or flake off when used as a coating or lining to petroleum-barrels, when subjected to the strain of rough handling.

This cement is not disturbed by drying in the sun, does not discolor the contents of the barrel when partly dry, and it presents an impervious lining to the passage of the oil in its ordinary condition for transportation and use.

In case the aforesaid compound is to be used in a very cold climate, chloride of sodium in a variable proportion may be added; or, if used in a very warm climate, sixteen parts of any insoluble salt of lime may be added.

Claim.

What we claim as our improvement is—

The herein-described compound, consisting of the ingredients and in about the proportion prepared, as and for the purpose set forth.

J. J. K. BOOTE.
W. A. GIBSON.

Witnesses:
GEO. A. KOLBE,
GEO. MENGER.